United States Patent Office 3,447,369
Patented June 3, 1969

3,447,369
WIND TUNNEL BALANCE
Eugene V. Horanoff, Clarksville, Md., assignor to the United States of America as represented by the Secretary of the Navy
Filed Oct. 27, 1967, Ser. No. 678,604
Int. Cl. G01m 9/00
U.S. Cl. 73—147                                                7 Claims

ABSTRACT OF THE DISCLOSURE

A wind tunnel balance for performing magnus and roll damping testing simultaneously having the wind tunnel model supported by a plurality of bearings such that the model may be spun by a two stage turbine. An air operated clutch is employed to engage and disengage the model support from the turbine. Magnus forces and moments are monitored by strain gages mounted at various locations on the balance, roll damping experienced by the rotating model is monitored by a tachometer, and the angular position of the model is monitored by transducers.

Background of the invention

The present invention relates generally to wind tunnel test balance devices and more particularly to a balance device having provision for the simultaneous measurement of roll damping, magnus forces and moments caused by the wind force acting externally on a spinning aerodynamic model undergoing wind tunnel testing.

When a spinning aerodynamic projectile is launched, small side forces in the yaw plane tend to effect the attitude of the projectile. The deviation is relatively small, on the order of two to five degrees, with the greater the distance the projectile travels the greater the amplification of the small deviation thereby adversely affecting the accuracy of the projectile trajectory. It has become increasingly important, therefore, to be able to measure the magnitude of the side forces or magnus forces and moments at small angles of attack in order to improve the design of aerodynamic projectiles to achieve greater accuracy flight. Furthermore, a spinning aerodynamic projectile experiences a decay in rate of rotation, roll damping, due to the frictional forces exerted on the projectile by the wind force passing thereover. The rate of rotation of a spinning aerodynamic projectile will constantly decay during flight, and in the case of a finned projectile the direction of rotation may reverse. It is therefore necessary to provide a measuring system within a wind tunnel which is capable of predicting the roll damping, magnus forces and moments which will be experienced by a spinning aerodynamic projectile in flight.

Prior art measuring systems have been limited to performing magnus and roll damping tests separately using different mechanisms. This necessitated running two separate tests, thus substantially increasing the wind tunnel operating time. The setup and calibration time required to run two separate tests also was substantially increased.

Summary of the invention

Accordingly, one object of this invention is to provide a new and improved wind tunnel balance capable of performing magnus and roll damping tests simultaneously.

Another object of this invention is the provision of a new and improved system for monitoring roll damping of a freely spinning wind tunnel balance which is affected only by the forces generated by the wind within the tunnel.

A further object of the instant invention is to provide a new and improved bearing support for a rotatable wind tunnel balance.

A still further object of this invention is the provision of a new and improved system for rotating a wind tunnel balance.

Still another further object of the instant invention is to provide a new and improved system for rotating a wind tunnel balance which is capable of disengaging the wind tunnel model once the desired spin rate has been achieved.

One other object of this invention is the provision of a novel air bearing support for a rotating wind tunnel balance.

Briefly, in accordance with one embodiment of this invention, these and other objects are obtained by providing in a wind tunnel balance a combination of a wind tunnel model support rotatably mounted on a bearing apparatus, a rotatable drive which is normally spaced from the model support and which has the capability of imparting a rotary motion to the model support when engaged therewith, an apparatus for bringing into engagement the model support and the rotatable drive to rotate the model support and to thereafter disengage the model support and the drive thus providing for the model support to spin freely and experience roll-damping, and apparatus for monitoring the rate of rotation of the model support. Flexures may also be employed on the wind tunnel balance for monitoring magnus forces simultaneously with the monitoring of roll-damping.

Brief description of the drawings

A more complete appreciation of the invention and many of the attended advantages thereof will be readily appreciated as the same becomes better understood by reference to the following detailed description when considered in connection with the accompanying drawings wherein.

Description of the preferred embodiment

Figure 1:
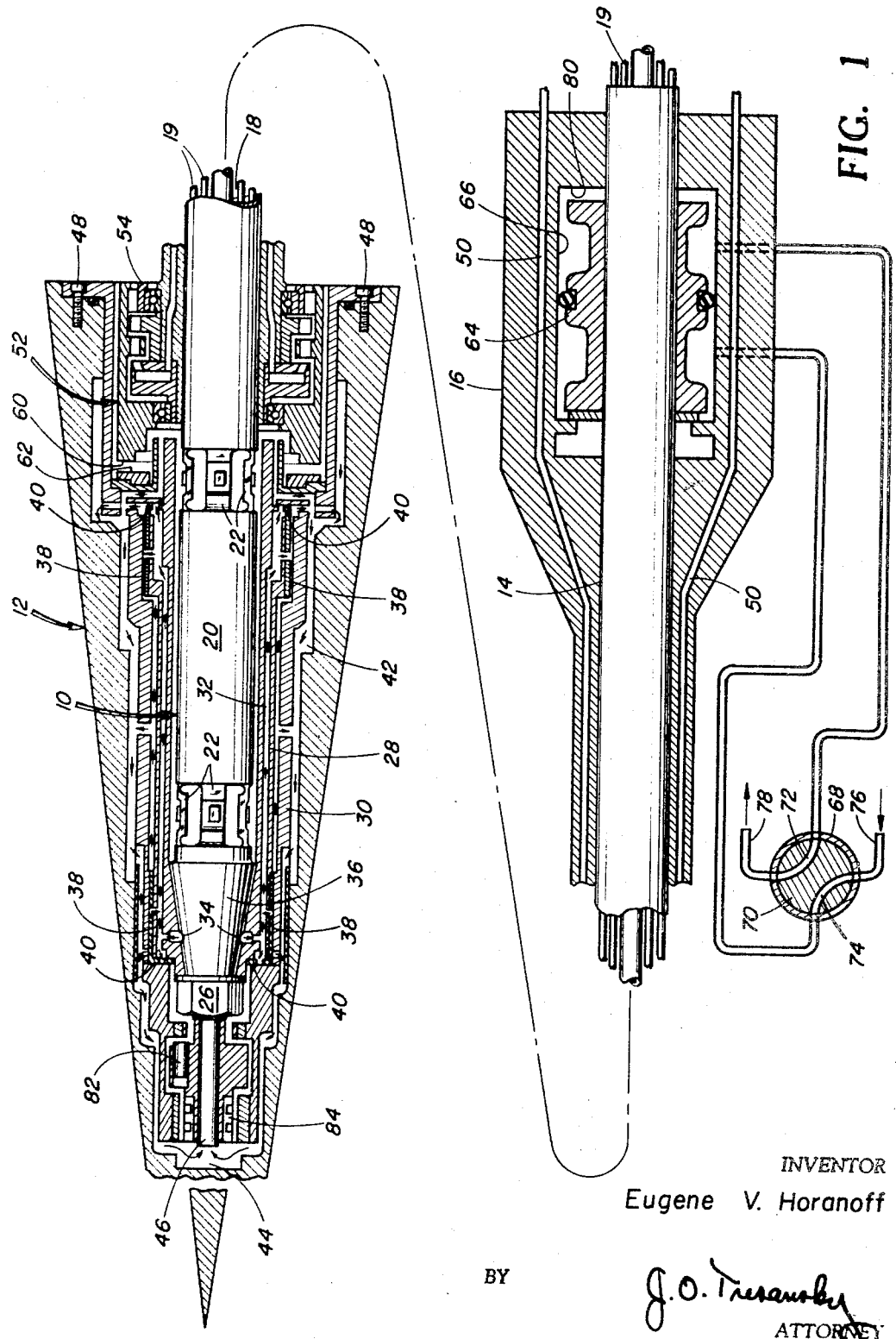
FIG. 1 is a sectional view in elevation of the wind tunnel balance showing the operative assemblies thereof.

Referring now to the drawings wherein like reference characters designate like parts throughout the several views and more particularly to FIG. 1 thereof, the numeral 10 generally indicates the balance device of the present invention supporting a test model 12. The balance device 10 is a generally cylindrical elongated body slidingly supported at a rearward portion 14 within a cylindrical support 16, and has a hollow central portion 18 for allowing passage of fluid conduits and wiring indicated at 19. The purpose of conduits 19 will be more fully explained hereinafter. On a forward portion 20 of balance device 10 are located a plurality of magnus flexures 22 each of which has a strain gage 24 mounted thereon, as more clearly illustrated in FIG. 2. The magnus flexures are not a part of the present invention, but are the invention of Joseph Iandolo as disclosed in patent application Ser. No. 542,121 filed Apr. 12, 1966, and are included in the device of the present invention to illustrate a provision for the internal measurement of magnus forces and moments caused by the wind force acting externally on the spinning aerodynamic model 12 undergoing wind tunnel testing.

A bearing support for the model 12 is fixedly attached to the forward portion 20 of balance device 10 by a securing member such as nut 26, engaging a threaded portion (not shown) of the balance and is made up of an inner race 28 and an outer space 30. The inner race 28 is secured to the balance device 10 in such a manner as to prevent rotation, and has a hollowed out air passage 32 in communication with air conduits 19 thru openings 34 in the forward conical portion 36 of balance device 10. The outer race 30 functions as the model support and is mounted for rotation about the inner race 28 by bearing means such as radial air bearings 38 and thrust air bearings 40. The air bearings 38 and 40 provide a clearance of, for example, 0.0075 inch between the bearing surfaces of the inner and outer races.

Air under pressure is introduced into the inner race through openings 34 by means of conduits 19 and proceeds through the air passage 32 into the air bearings 38 and 40. The air escaping along the surfaces of the air bearing causes the outer race 30 to float on the inner race 28. The expended air leaving the air bearings proceeds through return passage 42 into chamber 44 in the forward portion of the model 12 and exits to the rear of the balance device 10 by means of a return pipe 46. The air flow through the radial and thrust bearings can be more clearly understood by reference to the arrows shown in FIG. 2. One modification of the present invention may be the use of ball bearings in place of the air bearings illustrated in the drawing. The model 12 is secured to the model support or outer race 30 by means of fasteners such as screws 48 extending through the outer race 30.

Figure 2:
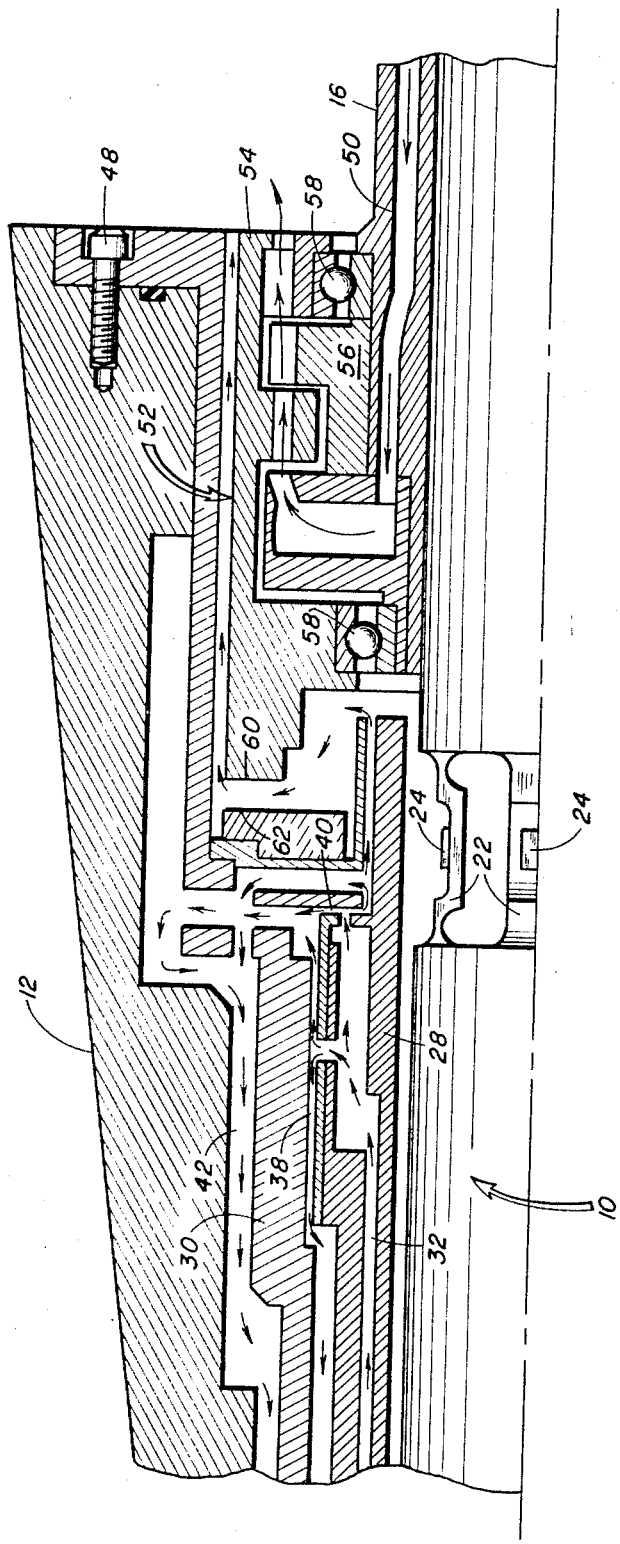
FIG. 2 is an exploded partial sectional view of the air bearing, turbine and clutch assemblies of the instant invention.

The cylindrical support member 16 is provided with conduits 50 providing air under pressure to a multistage turbine indicated generally at 52 which functions as a rotary drive for the outer race 30 and test model 12. Referring specifically to FIG. 2 it can be seen that the outer rotatable portion 54 of turbine 52 is circumferentially mounted on the inner stationary portion 56 by means of ball bearings 58, and has on the forward portion thereof a clutch face 60. On the rearward portion of the outer race 30 of the air bearing is located a clutch face 62 which is shown in the drawing as disengaged from clutch face 60.

Prior to testing of the model in the wind tunnel, the clutch face 62 on the model support 30 must be brought into engagement with clutch face 60 on turbine 52 in order to spin the model at the desired rate of rotation. The particular means for engaging the clutch is not part of the instant invention, and any state of the art mechanism can be used. The preferred embodiment for engaging the clutch as illustrated in FIG. 1 of the drawing consists of a piston 64 fixedly attached to the rearward portion 14 of the balance device. The piston 64 is mounted within the cylindrical support member 16 in a hollow cylinder portion 66 for sliding movement therein. A standard valve 68 for reversing piston direction is illustrated as having a rotary portion 70 with conduits 72 and 74. Pressure is introduced into the valve through a conduit 76, and pressure is relieved from the valve by the conduit 78. By rotating portion 70 of valve 68 ninety degrees, the direction of movement of piston 64 is reversed. To engage the clutch faces 60 and 62 the rotor 70 is positioned as shown in FIG. 1 such that piston 64 will move into engagement with cylinder wall 80. Thus clutch face 62 is brought back into engagement with clutch face 60. While in engagement, air under pressure is introduced through conduit 50 to spin the turbine and thus impart rotary motion to the model 12. Once the model has been spun to the desired rate of rotation valve rotor 70 is rotated 90 degrees such that piston 64 moves back into the position shown in FIG. 1. In the final position when the model is spinning free of clutch engagement, the model is solely supported by the radial and thrust bearings 38 and 40.

With the model, freely spinning on the air bearings the magnus forces created by the wind in the tunnel can be monitored by strain gages 24 while the decay in rate of rotation of the model can be monitored by a tachometer 82 secured to the forward end of the balance. A transducer 84 is provided on conduit 46 for locating the angular position of the model of the balance during the testing period.

To maintain the balance temperature during testing, cooling water may be introduced through conduits 19 to circulate within the balance.

Obviously, numerous modification and variations of the present invention are possible in the light of the above teachings. It is therefore to be understood that the invention may be practiced otherwise than as specifically described herein.

What is claimed as new and desired to be secured by Letters Patent of the United States is:

1. A roll-damping balance comprising
   an elongated body having a forward portion and an rearward portion,
   a model support encircling the forward portion of said elongated body,
   bearing means for rotatable mounting said model support on said elongated body,
   rotatable drive means normally spaced from said model support for imparting rotary motion to said model support when in engagement therewith, and
   means for engaging said model support and said rotatable drive means to rotate said model support and thereafter to disengage said model support and said drive means to allow said model support to spin freely and thus experience roll-damping.

2. The device of claim 1 further comprising means for monitoring the rate of rotation of said model support.

3. The device of claim 1 wherein said bearing means comprises a plurality of radial and thrust air bearings.

4. The device of claim 1 wherein said rotatable drive means comprises a multi-stage air turbine having a clutch face on the rotatable portion thereof adjacent said rearward portion of said model support.

5. The device of claim 4 further comprising a clutch face on the rearward portion of said model support in axial alignment with said clutch face on said air turbine.

6. The device of claim 5 further comprising means on said elongated body for monitoring the rate of rotation of said model support.

7. The device of claim 1 further comprising means on said elongated body for measuring magnus forces and moments.

References Cited

UNITED STATES PATENTS

| | | | |
|---|---|---|---|
| 2,864,568 | 12/1958 | Ikard et al. | |
| 2,885,890 | 5/1959 | Liccini et al. | 73—147 |
| 2,906,119 | 9/1959 | Montgomery | 73—147 |
| 3,034,348 | 5/1962 | Holderer | 73—147 |

LOUIS R. PRINCE, *Primary Examiner.*

JEFFREY NOLTON, *Assistant Examiner.*